US012808236B2

(12) United States Patent
Storck, III et al.

(10) Patent No.: US 12,808,236 B2
(45) Date of Patent: Nov. 24, 2026

(54) LATCH ACTUATOR TO PREVENT VEHICLE DOOR UNLATCHING

(71) Applicant: GM Global Technology Operations LLC, Detroit, MI (US)

(72) Inventors: Phillip C. Storck, III, Washington, MI (US); Besi Rrumbullaku, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 18/952,412

(22) Filed: Nov. 19, 2024

(65) Prior Publication Data

US 2026/0139522 A1 May 21, 2026

(51) Int. Cl.
*E05B 79/22* (2014.01)
*E05B 79/20* (2014.01)

(52) U.S. Cl.
CPC .............. *E05B 79/22* (2013.01); *E05B 79/20* (2013.01)

(58) Field of Classification Search
CPC .......... E05B 77/04; E05B 77/06; E05B 85/10; E05B 79/20; E05B 79/22; Y10S 292/22; Y10S 292/65
See application file for complete search history.

(56) References Cited

U.S. PATENT DOCUMENTS 8,360,486 B2 * 1/2013 Gschweng .............. E05B 77/04 292/336.3
8,376,424 B2 * 2/2013 Bejune .................... E05B 77/04 292/336.3
8,899,640 B2 * 12/2014 Bertolotti Potachin .................... E05B 79/20 292/336.3
9,033,093 B2 * 5/2015 Schoen ................... E05B 77/04 180/281
10,370,874 B2 * 8/2019 Rosales ................... E05B 79/22
2011/0062747 A1 * 3/2011 Teramoto ................ E05B 77/04 296/146.1
2023/0065236 A1 * 3/2023 Wahmann ............... E05B 77/34

* cited by examiner

*Primary Examiner* — Christine M Mills
*Assistant Examiner* — Yahya Sidky
(74) *Attorney, Agent, or Firm* — Honigman LLP; Matthew H. Szalach

(57) ABSTRACT

A vehicular door opening system for a vehicular door includes a door handle assembly, a door latch assembly, a latch actuation cable, and an actuator. The door handle assembly includes a door handle and a counterbalance configured to rotate during operation of the door handle assembly. The door latch assembly includes a latch release lever movable between (i) an engaged state where the latch release lever engages the vehicular door to secure the vehicular door in a closed state and (ii) a disengaged state where the latch release lever disengages the vehicular door to allow the vehicular door to move from the closed state to an opened state. Rotation of the counterbalance moves the latch release lever from the engaged state to the disengaged state. The actuator is operable to prevent the latch release lever from moving from the engaged state to the disengaged state.

19 Claims, 8 Drawing Sheets

LATCH ACTUATOR TO PREVENT VEHICLE DOOR UNLATCHING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a vehicle door of a vehicle, and specifically, to a door latch of the vehicle door. Vehicle doors are moveable between an open position and a closed position to selectively allow passengers to enter and exit the vehicle. Opening the door is commonly accomplished by a user pulling, pressing, or otherwise engaging with a door handle included at the vehicle door. Engaging with the door handle actuates a door latch, thus disengaging the door latch and allowing the vehicle door to open. The door latch is also configured to maintain the vehicle door in a closed position when engaged. Accordingly, inadvertent actuation of the door latch can prevent inadvertent opening of the vehicle door, thereby ensuring the vehicle door remains closed during operation of the vehicle.

SUMMARY

One aspect of the disclosure provides a vehicular door opening system for a vehicular door of a vehicle. The vehicular door opening system includes a door handle assembly, a door latch assembly, a latch actuation cable, and an actuator. The door handle assembly includes a door handle and a counterbalance configured to rotate during operation of the door handle assembly. The door latch assembly includes a latch release lever movable between (i) an engaged state where the latch release lever engages the vehicular door to secure the vehicular door in a closed state and (ii) a disengaged state where the latch release lever disengages the vehicular door to allow the vehicular door to move from the closed state to an opened state. The latch actuation cable includes a first end and a second end, the first end attached to the counterbalance of the door handle assembly and the second end attached to the latch release lever of the door latch assembly, wherein rotation of the counterbalance causes movement of the latch actuation cable and moves the latch release lever from the engaged state to the disengaged state. The actuator is operable to prevent the latch release lever from moving from the engaged state to the disengaged state. The actuator is operated responsive to a vehicle condition at the vehicle.

Implementations of this aspect of the disclosure may include one or more of the following optional features. In some examples, the latch actuation cable is routed through the actuator at a position between the first end and the second end. In some further examples, when the actuator is operated, a plunger of the actuator engages the latch actuation cable at the position. In some even further examples, when the actuator is operated, the plunger of the actuator decouples the latch actuation cable between the first end and the second end.

In some implementations, the actuator is positioned at or near the counterbalance of the door handle assembly. In some further implementations, when the actuator is operated, a plunger of the actuator engages the counterbalance of the door handle assembly to prevent rotation of the counterbalance.

In some configurations, the actuator is positioned at or near the latch release lever of the door handle assembly. In some further configurations, when the actuator is operated, a plunger of the actuator engages the latch release lever of the door latch assembly to prevent movement of the latch release lever from the engaged state to the disengaged state.

In some examples, responsive to the vehicle condition at the vehicle, the actuator is operated conjunctively with actuation of airbags of the vehicle.

In some implementations, the vehicle condition includes the vehicular door being obstructed.

Another aspect of the disclosure provides an actuator for a vehicular door of a vehicle. The actuator is operable to prevent a latch release lever of a door latch assembly from moving from an engaged state to a disengaged state. The actuator is operated responsive to a vehicle condition at the vehicle.

Implementations of this aspect of the disclosure may include one or more of the following optional features. In some examples, when the actuator is operated, a plunger of the actuator engages a latch actuation cable at a position between a first end of the latch actuation cable and a second end of the latch actuation cable, the first end attached to a counterbalance of a door handle assembly and the second end attached to the latch release lever of the door latch assembly. In some further examples, when the actuator is operated, the plunger of the actuator decouples the latch actuation cable between the first end and the second end.

In some implementations, when the actuator is operated, a plunger of the actuator engages a counterbalance of a door handle assembly to prevent rotation of the counterbalance.

In some configurations, when the actuator is operated, a plunger of the actuator engages the latch release lever of the door latch assembly to prevent movement of the latch release lever from the engaged state to the disengaged state.

Yet another aspect of the disclosure provides a vehicle. The vehicle includes a vehicular door opening system for a vehicular door of the vehicle. The vehicular door opening system includes a door handle assembly, a door latch assembly, a latch actuation cable, and an actuator. The door handle assembly includes a door handle and a counterbalance configured to rotate during operation of the door handle assembly. The door latch assembly includes a latch release lever movable between (i) an engaged state where the latch release lever engages the vehicular door to secure the vehicular door in a closed state and (ii) a disengaged state where the latch release lever disengages the vehicular door to allow the vehicular door to move from the closed state to an opened state. The latch actuation cable includes a first end and a second end, the first end attached to the counterbalance of the door handle assembly and the second end attached to the latch release lever of the door latch assembly, wherein rotation of the counterbalance causes movement of the latch actuation cable and moves the latch release lever from the engaged state to the disengaged state. The actuator is operable to prevent the latch release lever from moving from the engaged state to the disengaged state, the actuator operated responsive to a vehicle condition at the vehicle.

Implementations of this aspect of the disclosure may include one or more of the following optional features. In some examples, when the actuator is operated, a plunger of the actuator engages the latch actuation cable at a position between the first end and the second end. In some further examples, when the actuator is operated, the plunger of the actuator decouples the latch actuation cable between the first end and the second end.

In some implementations, when the actuator is operated, a plunger of the actuator engages the counterbalance of the door handle assembly to prevent rotation of the counterbalance.

In some configurations, when the actuator is operated, a plunger of the actuator engages the latch release lever of the door latch assembly to prevent movement of the latch release lever from the engaged state to the disengaged state.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1A:
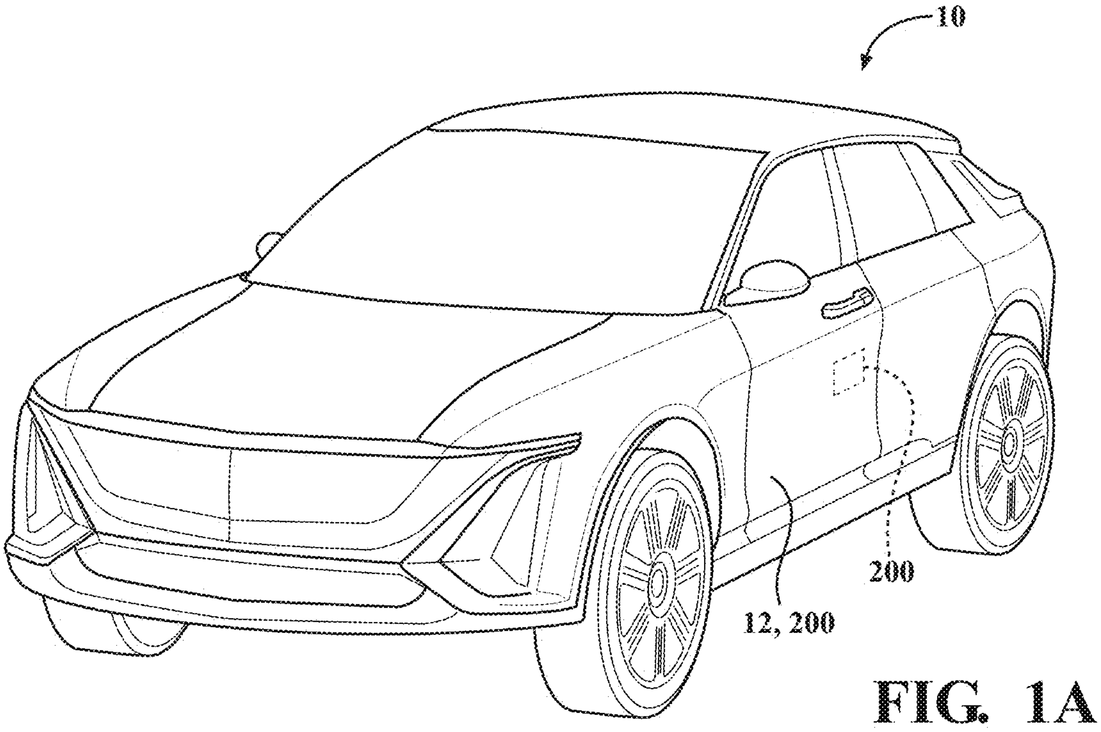
FIG. 1A is a perspective view of a vehicle including a vehicular door in a closed state according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1B:
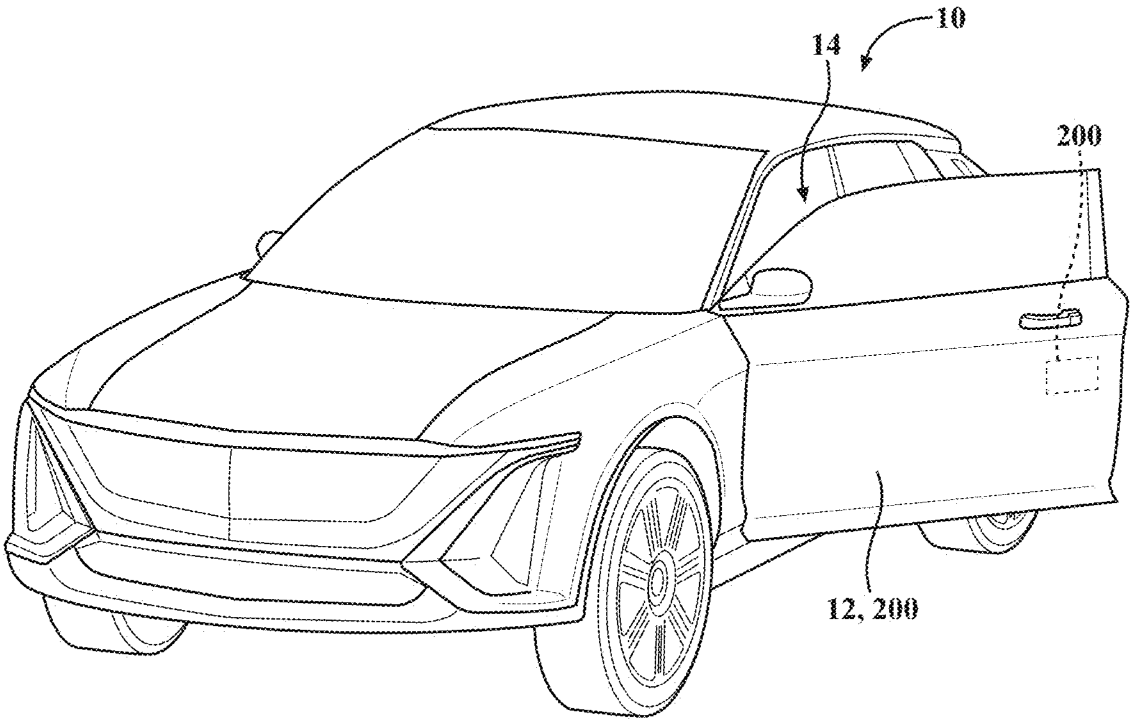
FIG. 1B is a perspective view of the vehicle of FIG. 1A including the vehicular door in an opened state.
Figure 2:
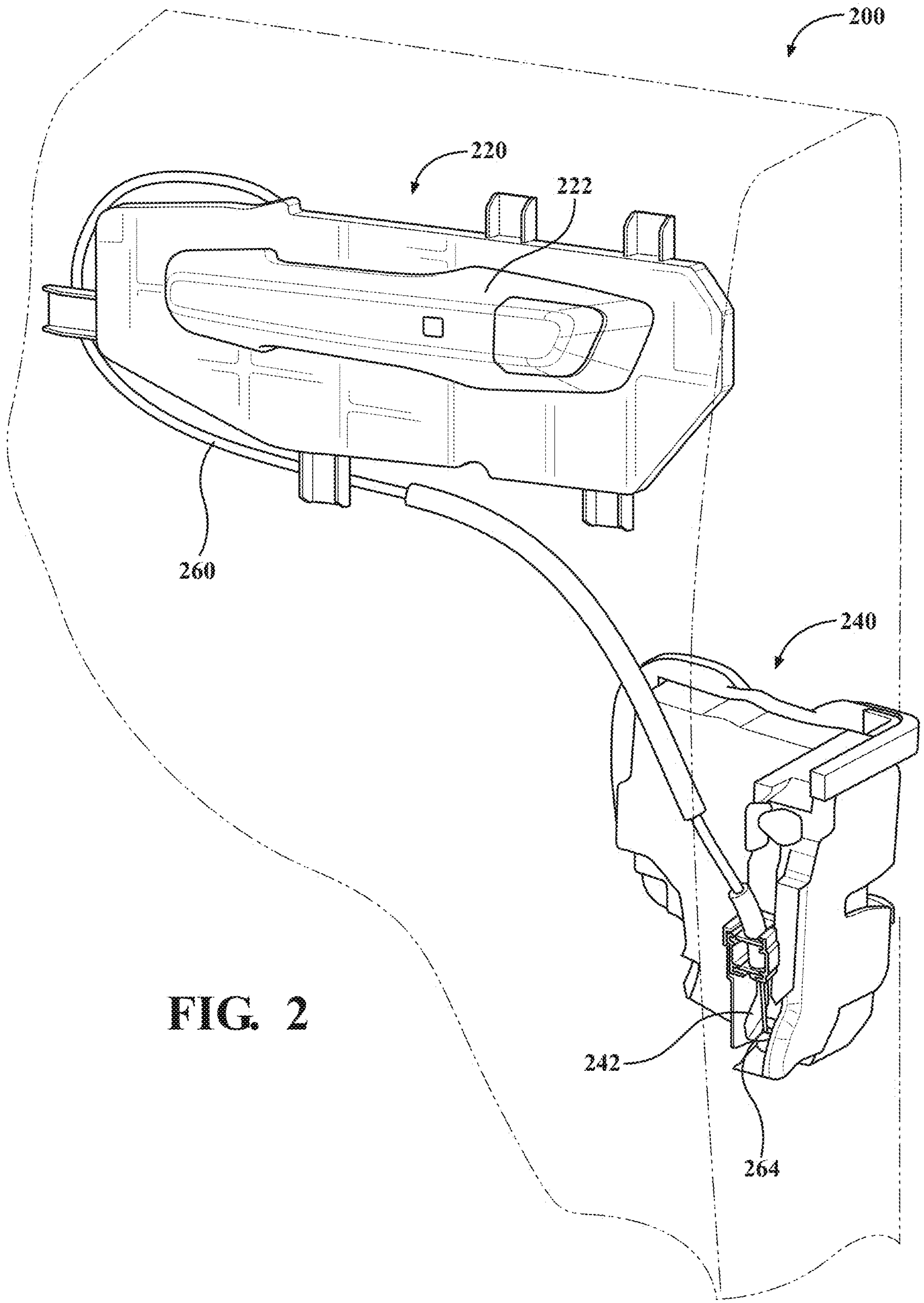
FIG. 2 is a perspective view of a vehicular door opening system according to the present disclosure.

With reference to FIGS. 1A and 1B, a vehicle 10 includes a vehicular door 12 configured to move between a closed state 100 and an opened state 102. When the vehicular door 12 is in the closed state 100 (FIG. 1A), the vehicular door 12 seals and conceals a door opening 14. When the vehicular door 12 is in the opened state 102 (FIG. 1B), the vehicular door 12 exposes and provides access to the door opening 14. The door opening 14 may enable ingress into the vehicle 10 and egress out of the vehicle 10 for a user or occupant of the vehicle 10. In other words, the vehicular door 12 may be moved from the closed state 100 to the opened state 102 to expose the door opening 14 when a user desires to enter the vehicle 10 or exit the vehicle 10. In an opposite manner, the vehicular door 12 may be moved from the opened state 102 to the closed state 100 to conceal the door opening 14 after a user has entered the vehicle 10 or after a user has exited the vehicle 10. It should be appreciated that the vehicle 10 may include any quantity of vehicular doors 12 as configured for the vehicle 10 without deviating from the context of this disclosure. For clarity and coherence of this disclosure, and as shown in the illustrated examples, the vehicular door 12 is positioned at a front-left position of the vehicle 10. Further, it should be understood that aspects of the present disclosure may be suitable with passenger doors of the vehicle as well as cargo doors or liftgates, hood panels, fuel port cover panels or electric charging connector cover panels, and other doors or panels at the vehicle 10 that move between opened and closed positions.

Figure 5A:
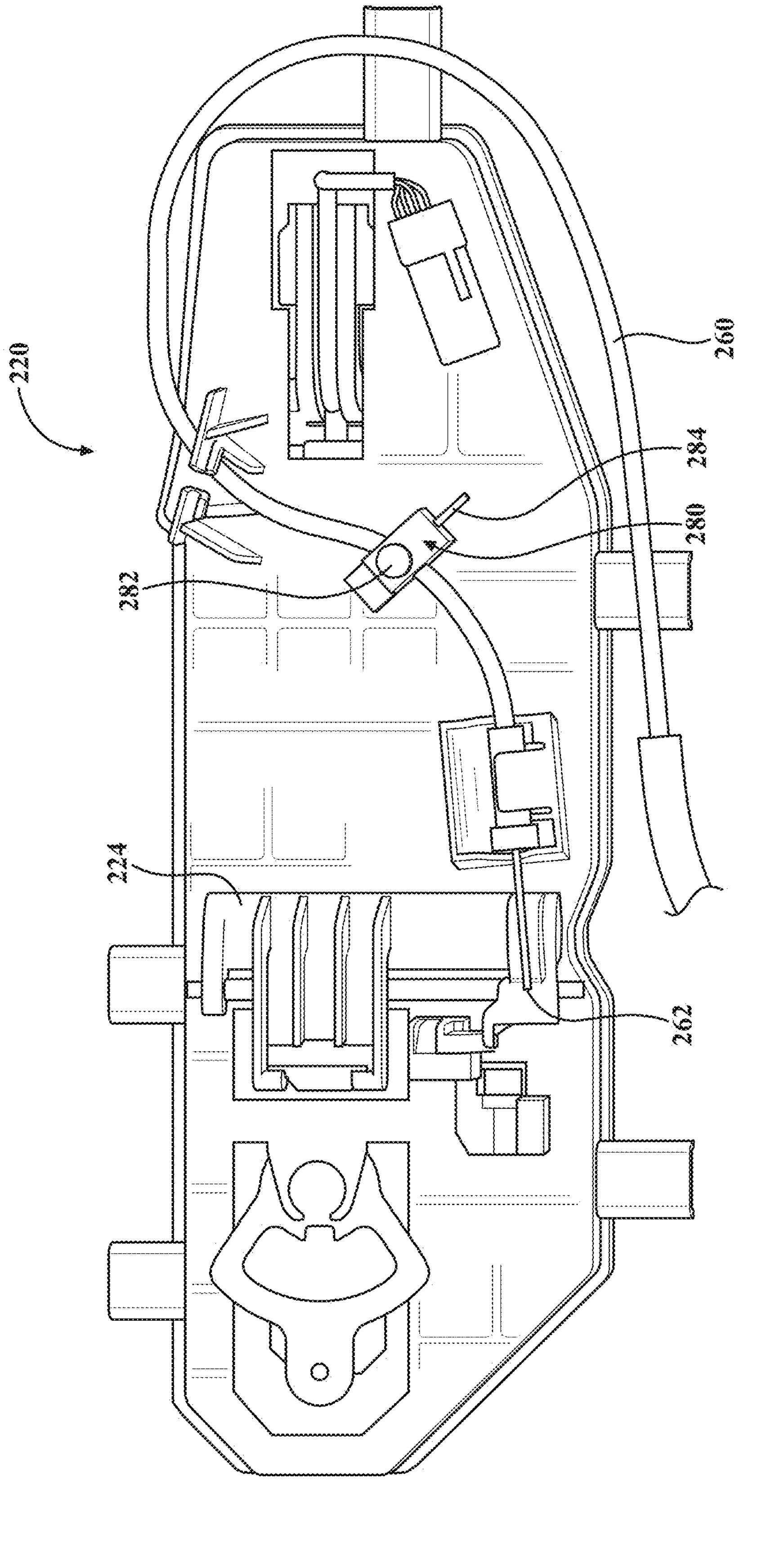
FIG. 5A is a rear-view of a door handle assembly of the vehicular door opening assembly of FIG. 2 including a latch actuation cable routed through the actuator of FIG. 4.

With reference to FIGS. 1-4, a vehicular door opening system 200 is included at the vehicular door 12. The vehicular door opening system 200 is operable to move the vehicular door 12 between the closed state 100 and the opened state 102, the operation of which will be described in greater detail below. The vehicular door opening system 200 includes a door handle assembly 220 positioned at the vehicular door 12. The door handle assembly 220 includes a door handle 222 and a counterbalance 224 configured to rotate during operation of the door handle assembly 220 (FIG. 5A). The door handle 222 is mechanically connected to the counterbalance 224 wherein engagement with or operation of the door handle 222 causes the counterbalance 224 to rotate. For example, when the user grasps the door handle 222 and pulls the door handle 222 relative to the vehicular door 12, the counterbalance 224 rotates relative to a bracket of the door handle assembly 220. In this regard, the door handle assembly 220 operates when the door handle 222 is engaged, thus rotating the counterbalance 224.

Operation of the door handle assembly 220 may occur responsive to different movements or engagements of the door handle 222. For example, if the door handle 222 is configured to pull outward of the vehicle 10 and return inward toward the vehicle 10, operation of the door handle assembly 220 occurs when the door handle 222 is pulled outward. In another example, if the door handle 222 is configured to rotate downward and return upward, operation of the door handle assembly 220 occurs when the door handle 222 is rotated downward. In another example, if the door handle 222 includes a button that presses inward toward the vehicle 10 and returns outward of the vehicle 10, operation of the door handle assembly 220 occurs when the button is pressed inward. It should be appreciated that the specific manner in which the door handle assembly 220 is engaged may vary without deviating from the context of this disclosure.

Figure 3A:
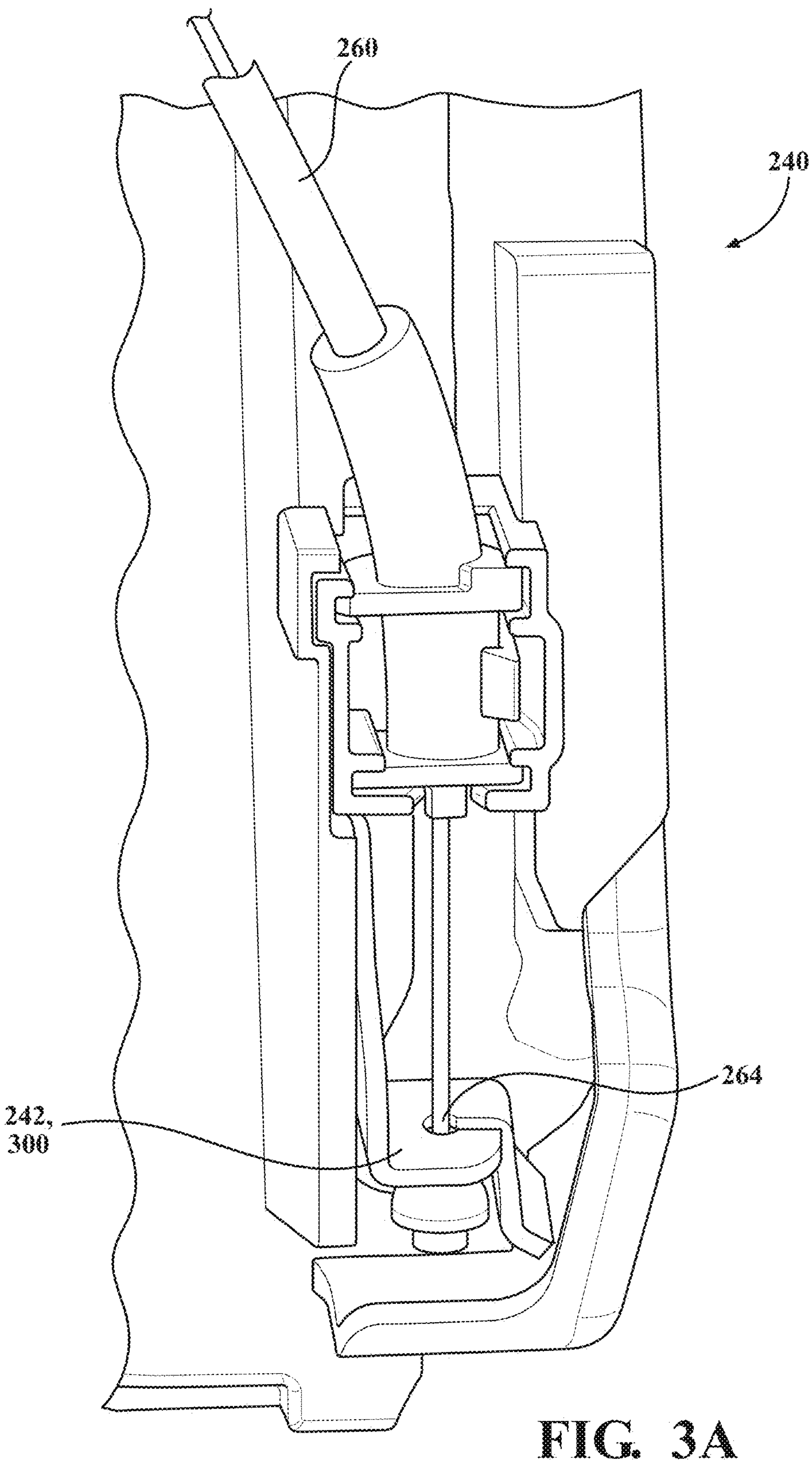
FIG. 3A is an enlarged view of a latch release lever of a door latch assembly of the vehicular door opening system of FIG. 2 in an engaged state.
Figure 3B:
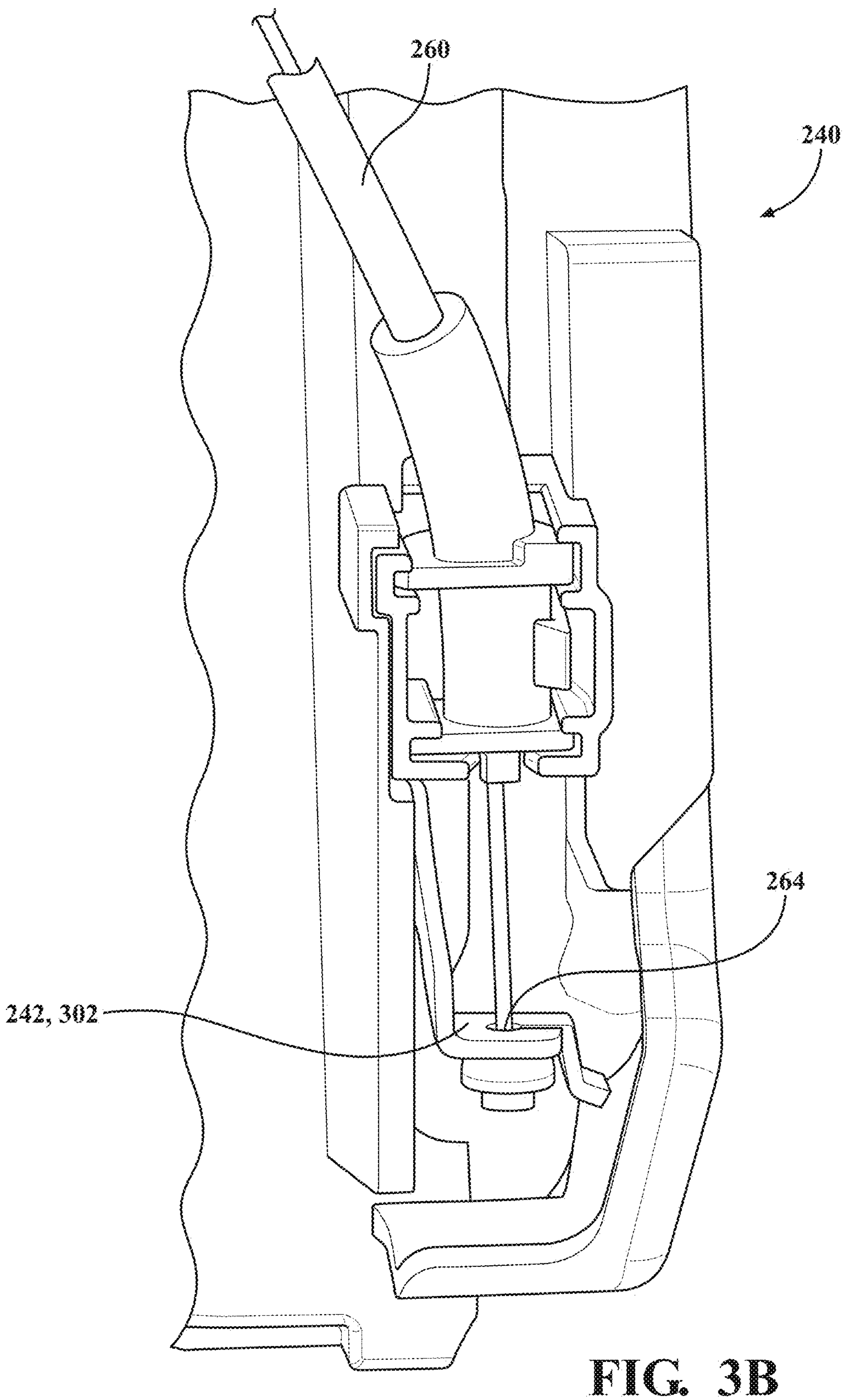
FIG. 3B is an enlarged view of the latch release lever of FIG. 3A in a disengaged state.
Figure 4:
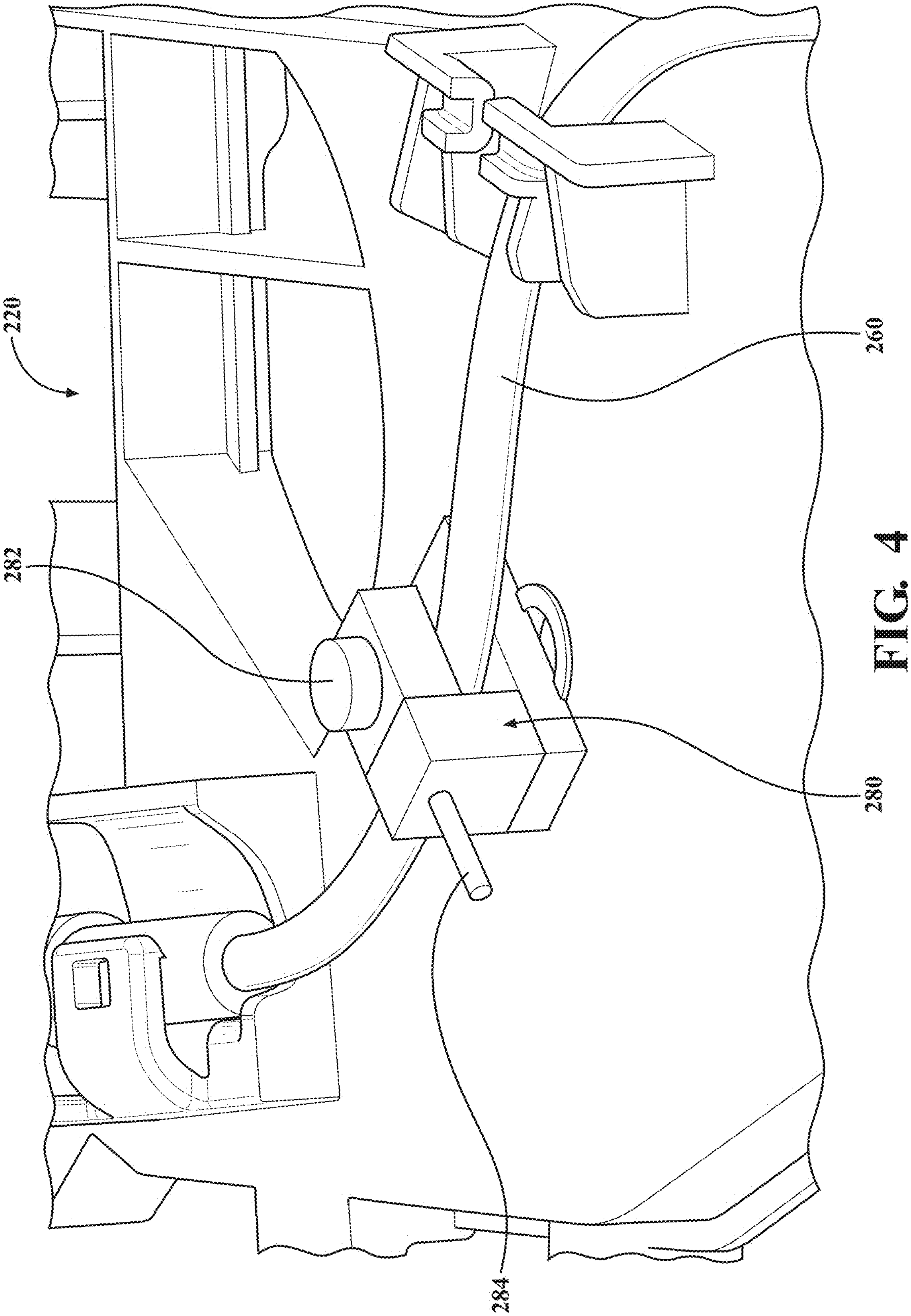
FIG. 4 is an enlarged view of an actuator of the vehicular door opening system of FIG. 2.

The vehicular door opening system 200 also includes a door latch assembly 240 positioned at or near the vehicular door 12. The door latch assembly 240 includes a latch release lever 242 movable between an engaged state 300 (FIG. 3A) and a disengaged state 302 (FIG. 3B). When the latch release lever 242 is in the engaged state 300 and the vehicular door 12 is in the closed state 100, the latch release lever 242 engages the vehicular door 12 at the door opening 14 to secure and maintain the vehicular door 12 in the closed state 100. For example, the latch release lever 242 may engage a latch or tab at the door opening 14 to secure the vehicular door 12 relative to the vehicle 10. In this regard, engagement of the vehicular door 12 via the latch release lever 242, when the vehicular door 12 is already in the closed state 100, renders the vehicular door 12 immovable relative to the door opening 14 and correspondingly seals the door opening 14. When the latch release lever 242 is in the disengaged state 302, the latch release lever 242 disengages the vehicular door 12 at the door opening 14 and enables the vehicular door 12 to move from the closed state 100 to the opened state 102 as desired. In this regard, disengagement of the vehicular door 12 via the latch release lever 242 renders the vehicular door 12 movable relative to the door opening 14.

A latch actuation cable 260 mechanically couples the door handle assembly 220 with the door latch assembly 240. The latch actuation cable 260 includes a first end 262 fixedly attached to the counterbalance 224 of the door handle assembly 220, and a second end 264 fixedly attached to the latch release lever 242 of the door latch assembly 240. In this regard, rotation of the counterbalance 224 causes movement of the latch release lever 242 via the latch actuation cable 260. For example, the latch actuation cable 260 may be slacked or relaxed when the door handle 222 of the door handle assembly 220 is disengaged. However, when the door handle 222 is engaged, the counterbalance 224 correspondingly rotates. Rotation of the counterbalance 224 causes the latch actuation cable 260 to become taught and unrelaxed, thus forcing movement of the latch release lever 242 from the engaged state 300 to the disengaged state 302. As shown in FIGS. 3A and 3B, placing the actuation cable 260 under tension applies a force on the latch release lever 242, thereby causing the lever 242 to move in an upward direction relative to the views shown in FIGS. 3A and 3B. Such movement may disengage a latch (not shown) from engagement with a striker (not shown) attached to a frame or other structure of a body of the vehicle 10, which allows the vehicular door 12 to move relative to the body of the vehicle 10. As stated above, moving the latch release lever 242 from the engaged state 300 to the disengaged state 302 disengages the vehicular door 12, thus allowing the vehicular door 12 to move from the closed state 100 to the opened state 102. In an opposite manner, disengagement of the door handle 222 once again rotates the counterbalance 224 and causes the latch actuation cable 260 to become slacked and relaxed, thus moving the latch release lever 242 from the disengaged state 302 to the engaged state 300.

With continued reference to FIGS. 1-4, movement of the latch actuation cable 260, such as due to the door handle 222 being engaged and operated and/or the counterbalance 224 being rotated, causes the latch release lever 242 to move from the engaged state 300 to the disengaged state 302. This may occur inadvertently during deformation at the vehicle 10, such as due to direct engagement of an object with the door handle 222 and/or inertial forces from the deformation, causing the counterbalance 224 to rotate. To prevent the latch release lever 242 from unintentionally moving from the engaged state 300 to the disengaged state 302, such as when it is desired to maintain the vehicular door 12 in the closed state 100, an actuator 280 is included at the vehicular door opening system 200. The actuator 280 is operable to prevent the latch release lever 242 from moving from the engaged state 300 to the disengaged state 302. For example, the actuator 280 includes a plunger 282 that is configured to maintain the latch release lever 242 in the engaged state 300 when the plunger 282 of the actuator 280 is triggered. In this regard, the actuator 280 also maintains the vehicular door 12 in the closed state 100 when the actuator 280 is triggered.

The actuator 280 also includes an electrical connector 284 that electrically connects the actuator 280 to a wiring harness of the vehicle 10. To trigger operation of the actuator 280, the electrical connector 284 receives an electrical charge or signal that is generated responsive to a vehicle condition that occurs at the vehicle 10. The vehicle condition may be, for example, the vehicular door 12 being obstructed, the vehicular door 12 being deformed, or the door latch assembly 240 being inoperable. For example, the actuator 280 may be electrically connected to a mitigation system of the vehicle 10 that detects the vehicle condition at the vehicle 10 and triggers airbags, hazard lights, and/or other mitigation devices at the vehicle, including the actuator 280. Operation of the actuator 280 may trigger movement of the plunger 282, such as by igniting an explosive charge at the actuator 280. Triggering the plunger 282 causes the plunger 282 to rapidly extend or otherwise move, wherein movement of the plunger 282 prevents the latch release lever 242 from moving from the engaged state 300 to the disengaged state 302, as discussed further below.

Operation of the actuator 280 may be triggered by any suitable vehicle condition at the vehicle 10. For example, the vehicle 10 may include a sensor that measures force at a side of the vehicle, such as an obstruction or a deformation at the vehicular door 12, and the vehicle 10 may be equipped with sensors for detecting obstructions and deformations at other portions of the vehicle. The actuator 280 may be operated based on detecting any obstruction or deformation at the vehicle 10, or the actuator 280 may be operated only based on detecting an obstruction or deformation at the particular vehicular door 12 of the vehicle 10 at which the actuator 280 is positioned. Optionally, the actuator 280 may be operated based on the detected obstruction or deformation being greater than a threshold level. For example, the actuator 280 may be operated based on a sensor sensing a load indicative of obstruction or deformation. The actuator 280 may be operated in conjunction with actuation of airbags (and/or other mitigation devices) at the vehicle 10, or the actuator 280 may be operated independently of airbags (and/or other mitigation devices) at the vehicle 10.

With reference to FIGS. 1-5C, placement and location of the actuator 280 at the vehicular door opening system 200 may vary. In this regard, the actuator 280 may be included at any location of the vehicular door opening system 200 where maintaining the latch release lever 242 of the door latch assembly 240 in the engaged state 300 is accommodated. In other words, preventing the latch release lever 242 from moving out of the engaged state 300 and into the disengaged state 302 may be accomplished by the actuator 280 at varying positions within the vehicular door opening system 200. For example, and with specific reference to FIG. 5A, the actuator 280 may be positioned at a mounting position 202 of the vehicular door opening system 200. The mounting position 202 may be at any location adjacent to the latch actuation cable 260 where the latch actuation cable 260 may be routed through the actuator 280. In this regard, the mounting position 202 may be any location near the latch actuation cable 260 between the first end 262 and the second end 264 of the latch actuation cable 260.

Routing the latch actuation cable 260 through the actuator 280 at the mounting position 202 allows the plunger 282 of the actuator 280 to engage with the latch actuation cable 260 when the actuator 280 is operated. In other words, triggering the plunger 282 when the electrical connector 284 receives an electrical charge may rapidly extend the plunger 282 toward the latch actuation cable 260 to forcefully engage the plunger 282 with the latch actuation cable 260. The latch actuation cable 260 may be severed or decoupled by the plunger 282 when the plunger 282 is triggered, such as when the plunger 282 incorporates a cutter or a sharp edge or something of the like. Decoupling the latch actuation cable 260 removes the mechanical connection between the counterbalance 224 of the door handle assembly 220 and the latch release lever 242 of the door latch assembly 240. In this regard, the latch actuation cable 260 remains slacked and untaught regardless of engagement with the door handle 222 and regardless of rotation of the counterbalance 224 after the latch actuation cable 260 has been severed and decoupled. This maintains the latch release lever 242 in the engaged state 300 after the latch actuation cable 260 has been severed and decoupled, regardless of engagement with the door handle 222 and regardless of rotation of the counterbalance 224. As a result, the vehicular door 12 remains in the closed state 100.

In a similar example, the latch actuation cable 260 may be securely pinched or compressed or clamped by the plunger 282 when the plunger 282 is triggered, such as when the plunger 282 incorporates a blunt edge or something of the like. Pinching the latch actuation cable 260 prevents the mechanical connection between the counterbalance 224 of the door handle assembly 220 and the latch release lever 242 of the door latch assembly 240 from operating. That is, the latch actuation cable 260 is prevented from moving from the engaged state to the disengaged state. In this regard, the latch actuation cable 260 remains slacked and untaught between the actuator 280 and the latch release lever 242. Furthermore, engagement with the door handle 222 becomes disabled, and the counterbalance 224 if prevented or otherwise locked from rotation after the latch actuation cable 260 has been pinched. This maintains the latch release lever 242 in the engaged state 300 after the latch actuation cable 260 has been pinched due to the counterbalance 224 being disabled from rotation. As a result, the vehicular door 12 remains in the closed state 100.

Figure 5B:
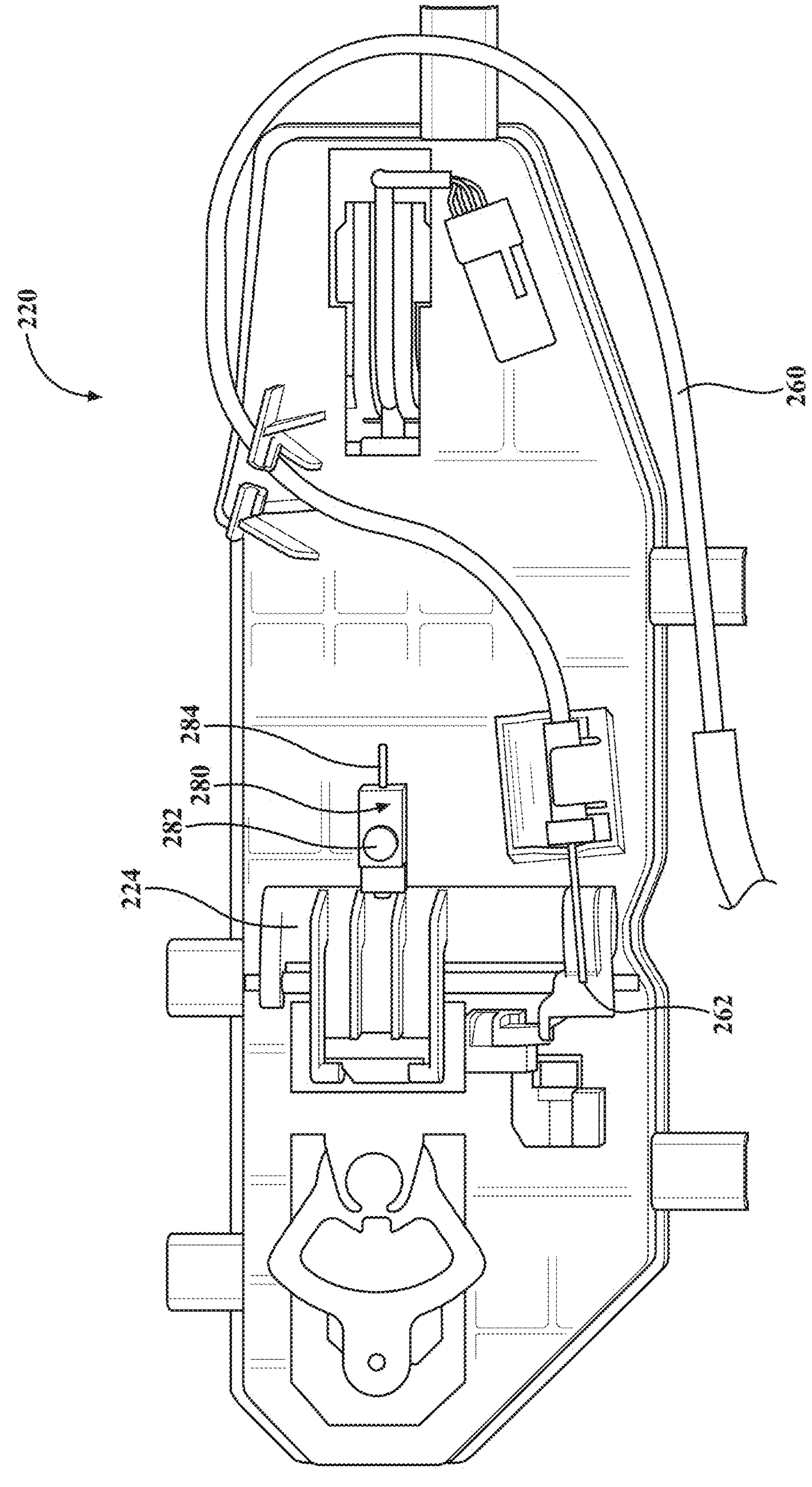
FIG. 5B is an enlarged view of the actuator of FIG. 4 positioned at a counterbalance of the door handle assembly of FIG. 5A.

In another example, and with specific reference to FIG. 5B, the actuator 280 may be positioned at or near the counterbalance 224 of the door handle assembly 220. Positioning the actuator 280 at or near the counterbalance 224 allows the plunger 282 of the actuator 280 to engage with the counterbalance 224 when the actuator 280 is operated. In other words, triggering the plunger 282 when the electrical connector 284 receives an electrical charge may rapidly extend the plunger 282 toward the counterbalance 224 so as to forcefully engage the plunger 282 with the counterbalance 224. Engaging the plunger 282 with the counterbalance 224 may block and prevent rotation of the counterbalance 224. Preventing rotation of the counterbalance 224 correspondingly prevents the mechanical connection between the counterbalance 224 and the latch release lever 242 from operating. In this regard, the latch actuation cable 260 remains slacked and untaught between the actuator 280 and the latch release lever 242. Furthermore, engagement with the door handle 222 becomes disabled because the counterbalance 224 is prevented or otherwise locked from rotation after the plunger 282 engages with the counterbalance 224. This maintains the latch release lever 242 in the engaged state 300 due to the counterbalance 224 being disabled from rotation. As a result, the vehicular door 12 remains in the closed state 100.

Figure 5C:
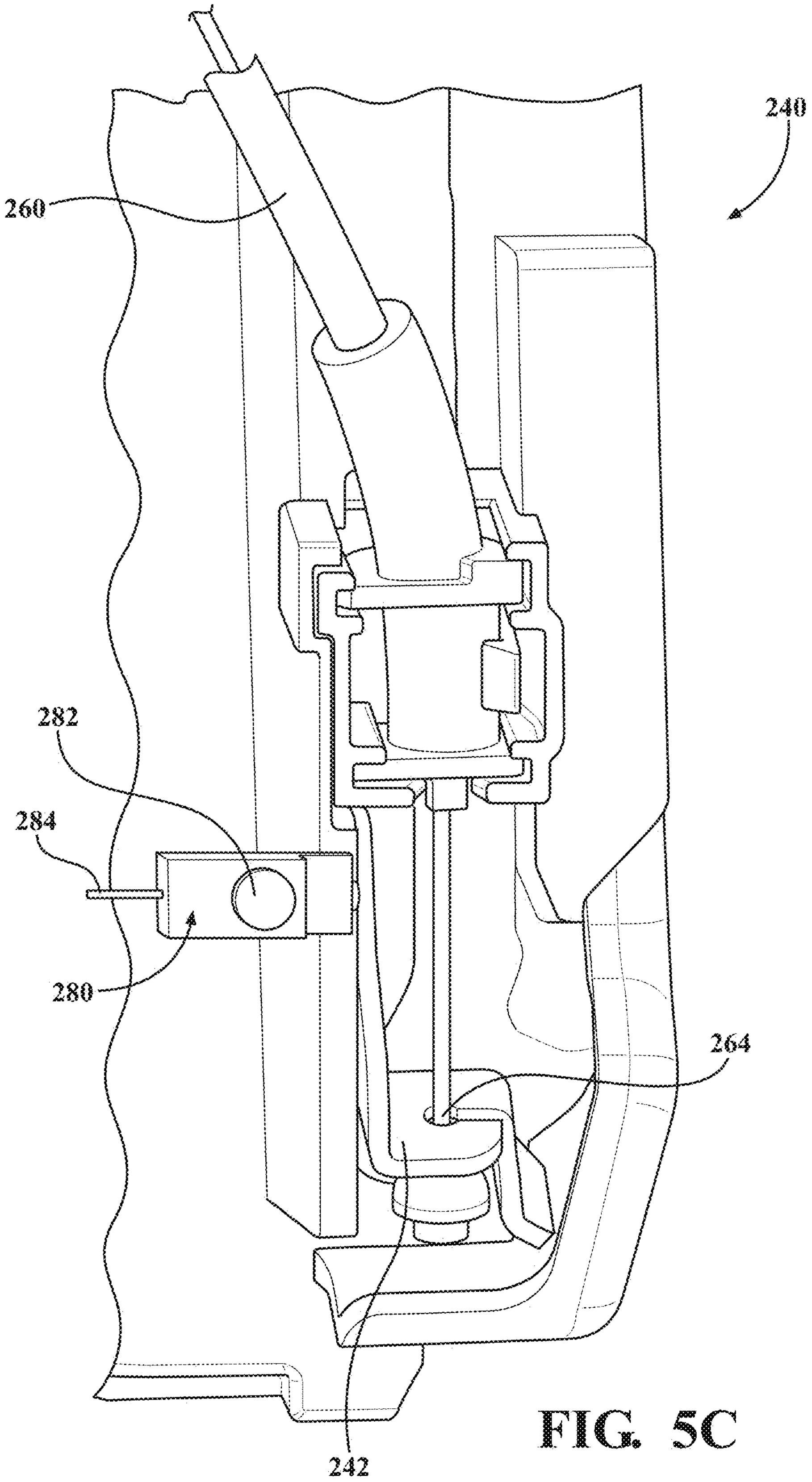
FIG. 5C is an enlarged view of the door latch assembly of FIG. 3A including the actuator of FIG. 4 positioned at the latch release lever.

In another example, and with specific reference to FIG. 5C, the actuator 280 may be positioned at or near the latch release lever 242 of the door latch assembly 240. Positioning the actuator 280 at or near the latch release lever 242 allows the plunger 282 of the actuator 280 to engage with the latch release lever 242 when the actuator 280 is operated. In other words, triggering the plunger 282 when the electrical connector 284 receives an electrical charge may rapidly extend the plunger 282 toward the latch release lever 242 to forcefully engage the plunger 282 with the latch release lever 242. Engaging the plunger 282 with the latch release lever 242 may block and prevent the latch release lever 242 from moving out of the engaged state 300 and into the disengaged state 302. For example, engaging the plunger 282 with the latch release lever 242 may mechanically block the latch release lever 242 from moving, thus preventing the latch release lever 242 from moving out of the engaged state 300. Preventing movement of the latch release lever 242 correspondingly prevents engagement with the door handle 222, or prevents rotation of the counterbalance 224, from moving the latch release lever 242. In this regard, the latch actuation cable 260 is disabled from affecting or controlling the state 300, 302 of the latch release lever 242. This maintains the latch release lever 242 in the engaged state 300 due to the plunger 282 forcibly engaging with the latch release lever 242. As a result, the vehicular door 12 remains in the closed state 100.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicular door opening system for a vehicular door of a vehicle, the vehicular door opening system comprising:

a door handle assembly including a door handle and a counterbalance configured to rotate during operation of the door handle assembly;

a door latch assembly including a latch release lever movable between (i) an engaged state where the latch release lever engages the vehicular door to secure the vehicular door in a closed state and (ii) a disengaged state where the latch release lever disengages the vehicular door to allow the vehicular door to move from the closed state to an opened state;

a latch actuation cable including a first end and a second end, the first end attached to the counterbalance of the door handle assembly and the second end attached to the latch release lever of the door latch assembly, wherein rotation of the counterbalance causes movement of the latch actuation cable and moves the latch release lever from the engaged state to the disengaged state; and an actuator that is operable to prevent the latch release lever from moving from the engaged state to the disengaged state, the actuator operated responsive to a vehicle condition, wherein the latch actuation cable is routed through the actuator at a position between the first end and the second end.

2. The vehicular door opening system of claim 1, wherein, when the actuator is operated, a plunger of the actuator engages the latch actuation cable at the position.

3. The vehicular door opening system of claim 2, wherein, when the actuator is operated, the plunger of the actuator decouples the latch actuation cable between the first end and the second end.

4. The vehicular door opening system of claim 1, wherein the actuator is positioned at or near the counterbalance of the door handle assembly.

5. The vehicular door opening system of claim 4, wherein, when the actuator is operated, a plunger of the actuator engages the counterbalance of the door handle assembly to prevent rotation of the counterbalance.

6. The vehicular door opening system of claim 1, wherein the actuator is positioned at or near the latch release lever of the door latch assembly.

7. The vehicular door opening system of claim 6, wherein, when the actuator is operated, a plunger of the actuator engages the latch release lever of the door latch assembly to prevent movement of the latch release lever from the engaged state to the disengaged state.

8. The vehicular door opening system of claim 1, wherein, responsive to the vehicle condition at the vehicle, the actuator is operated conjunctively with actuation of airbags of the vehicle.

9. The vehicular door opening system of claim 1, wherein the vehicle condition includes the vehicular door being obstructed.

10. An actuator for a vehicular door of a vehicle, the actuator:

operable to prevent a latch release lever of a door latch assembly from moving from an engaged state to a disengaged state, the actuator operated responsive to a vehicle condition at the vehicle, wherein, when the actuator is operated, a plunger of the actuator engages a latch actuation cable at a position between a first end of the latch actuation cable and a second end of the latch actuation cable, the first end attached to a counterbalance of a door handle assembly, and the second end attached to the latch release lever of the door latch assembly.

11. The actuator of claim 10, wherein, when the actuator is operated, the plunger of the actuator decouples the latch actuation cable between the first end and the second end.

12. The actuator of claim 10, wherein, when the actuator is operated, the plunger of the actuator engages the counterbalance of the door handle assembly to prevent rotation of the counterbalance.

13. The actuator of claim 10, wherein, when the actuator is operated, the plunger of the actuator engages the latch release lever of the door latch assembly to prevent movement of the latch release lever from the engaged state to the disengaged state.

14. The actuator of claim 10, wherein, responsive to the vehicle condition at the vehicle, the actuator is operated conjunctively with actuation of airbags of the vehicle.

15. The actuator of claim 10, wherein the vehicle condition includes the vehicular door being obstructed.

16. A vehicle comprising:

a vehicular door opening system for a vehicular door of the vehicle, the vehicular door opening system including:

a door handle assembly including a door handle and a counterbalance configured to rotate during operation of the door handle assembly;

a door latch assembly including a latch release lever movable between (i) an engaged state where the latch release lever engages the vehicular door to secure the vehicular door in a closed state and (ii) a disengaged state where the latch release lever disengages the vehicular door to allow the vehicular door to move from the closed state to an opened state;

a latch actuation cable including a first end and a second end, the first end attached to the counterbalance of the door handle assembly and the second end attached to the latch release lever of the door latch assembly, wherein rotation of the counterbalance causes movement of the latch actuation cable and moves the latch release lever from the engaged state to the disengaged state; and an actuator that is operable to prevent the latch release lever from moving from the engaged state to the disengaged state, the actuator operated responsive to a vehicle condition at the vehicle, wherein, when the actuator is operated, a plunger of the actuator engages the latch actuation cable at a position between the first end and the second end.

17. The vehicle of claim 16, wherein, when the actuator is operated, the plunger of the actuator decouples the latch actuation cable between the first end and the second end.

18. The vehicle of claim 16, wherein, when the actuator is operated, the plunger of the actuator engages the counterbalance of the door handle assembly to prevent rotation of the counterbalance.

19. The vehicle of claim 16, wherein, when the actuator is operated, the plunger of the actuator engages the latch release lever of the door latch assembly to prevent movement of the latch release lever from the engaged state to the disengaged state.

* * * * *